United States Patent
DeBruyne et al.

(10) Patent No.: US 9,460,018 B2
(45) Date of Patent: Oct. 4, 2016

(54) METHOD AND APPARATUS FOR TRACKING EXTRA DATA PERMISSIONS IN AN INSTRUCTION CACHE

(75) Inventors: Leslie Mark DeBruyne, Cary, NC (US); James Norris Dieffenderfer, Apex, NC (US); Michael Scott McIlvaine, Raleigh, NC (US); Brian Michael Stempel, Raleigh, NC (US)

(73) Assignee: QUALCOMM Incorporated, San Diego, CA (US)

( * ) Notice: Subject to any disclaimer, the term of this patent is extended or adjusted under 35 U.S.C. 154(b) by 573 days.

(21) Appl. No.: 13/535,398

(22) Filed: Jun. 28, 2012

(65) Prior Publication Data
US 2013/0304993 A1    Nov. 14, 2013

Related U.S. Application Data

(60) Provisional application No. 61/644,622, filed on May 9, 2012.

(51) Int. Cl.
*G06F 12/0888* (2016.01)
*G06F 12/08* (2016.01)
*G06F 12/14* (2006.01)

(52) U.S. Cl.
CPC ....... *G06F 12/0875* (2013.01); *G06F 12/0886* (2013.01); *G06F 12/145* (2013.01); *G06F 12/1416* (2013.01)

(58) Field of Classification Search
CPC ..... G06F 9/125; G06F 9/3815; G06F 9/3885
See application file for complete search history.

(56) References Cited

U.S. PATENT DOCUMENTS

| | | | | |
|---|---|---|---|---|
| 7,020,758 | B2 * | 3/2006 | Fisk | H04L 41/08 711/114 |
| 7,330,959 | B1 | 2/2008 | Anvin | |
| 7,337,272 | B2 * | 2/2008 | Morrow | G06F 9/30149 711/125 |
| 7,398,418 | B2 * | 7/2008 | Soran | G06F 3/0608 711/114 |
| 7,404,042 | B2 | 7/2008 | Stempel et al. | |
| 7,406,613 | B2 * | 7/2008 | Dieffenderfer | G06F 9/30054 711/E12.061 |
| 7,454,566 | B1 * | 11/2008 | Overby | G06F 3/0607 711/100 |
| 7,882,307 | B1 * | 2/2011 | Wentzlaff | G06F 12/0813 711/119 |
| 7,971,025 | B2 * | 6/2011 | Murase | G06F 3/0607 711/161 |
| 8,117,404 | B2 | 2/2012 | Yeh et al. | |
| 8,332,594 | B2 * | 12/2012 | Borntraeger | G06F 12/109 711/147 |

(Continued)

*Primary Examiner* — Yaima Rigol
*Assistant Examiner* — Mohamed Gebril
(74) *Attorney, Agent, or Firm* — Kenneth K. Vu

(57) ABSTRACT

Systems and methods are disclosed for maintaining an instruction cache including extended cache lines and page attributes for main cache line portions of the extended cache lines and, at least for one or more predefined potential page-crossing instruction locations, additional page attributes for extra data portions of the corresponding extended cache lines. In addition, systems and methods are disclosed for processing page-crossing instructions fetched from an instruction cache having extended cache lines.

26 Claims, 10 Drawing Sheets

(56) References Cited

U.S. PATENT DOCUMENTS

| | | | |
|---|---|---|---|
| 8,364,910 B2 * | 1/2013 | Wilkerson et al. | 711/152 |
| 8,499,114 B1 * | 7/2013 | Vincent | G06F 9/5077 711/147 |
| 8,631,205 B1 * | 1/2014 | Wentzlaff | G06F 12/0813 710/10 |
| 8,909,845 B1 * | 12/2014 | Sobel | G06F 9/45558 711/154 |
| 2003/0196044 A1 * | 10/2003 | Ramirez | G06F 9/3802 711/137 |
| 2004/0168043 A1 | 8/2004 | Keller et al. | |
| 2005/0268067 A1 * | 12/2005 | Lee | G06F 12/10 711/202 |
| 2008/0189506 A1 | 8/2008 | Kopec et al. | |
| 2008/0263299 A1 * | 10/2008 | Suzuki | G06F 11/1662 711/162 |
| 2009/0119485 A1 | 5/2009 | Smith et al. | |
| 2009/0198909 A1 | 8/2009 | Speight et al. | |
| 2009/0204872 A1 * | 8/2009 | Yu | G06F 3/0613 714/773 |
| 2009/0240880 A1 * | 9/2009 | Kawaguchi | G06F 3/0617 711/114 |
| 2009/0313695 A1 | 12/2009 | Bridges et al. | |
| 2010/0169401 A1 * | 7/2010 | Gopal | G06F 7/02 708/316 |
| 2010/0281208 A1 * | 11/2010 | Yang | G06F 3/0611 711/103 |
| 2010/0306174 A1 * | 12/2010 | Otani | G06F 11/1464 707/640 |
| 2011/0185120 A1 * | 7/2011 | Jess | G06F 3/061 711/114 |
| 2012/0036342 A1 | 2/2012 | King | |
| 2014/0089598 A1 | 3/2014 | Debruyne et al. | |

\* cited by examiner

|  | WAY 0 | | ... | | WAY N |
|---|---|---|---|---|---|
| SET 0 | EXTENDED CACHE LINE | | ... | | EXTENDED CACHE LINE |
| SET 1 | EXTENDED CACHE LINE | | ... | | EXTENDED CACHE LINE |
| ⋮ | ⋮ | ⋮ | ... | ⋮ | ⋮ |
| SET M | EXTENDED CACHE LINE | | ... | | EXTENDED CACHE LINE |

FIG. 4A

|  | WAY 0 | | | WAY N |
|---|---|---|---|---|
| POTENTIAL PAGE CROSSING LOCATION 0 | ADDITIONAL PAGE ATTRIB. | ... | | ADDITIONAL PAGE ATTRIB. |
| | ⋮ | ⋮ | | ⋮ |
| POTENTIAL PAGE CROSSING LOCATION $N_{PPCL}$ | ADDITIONAL PAGE ATTRIB. | ... | | ADDITIONAL PAGE ATTRIB. |

FIG. 4C

METHOD AND APPARATUS FOR TRACKING EXTRA DATA PERMISSIONS IN AN INSTRUCTION CACHE

PRIORITY CLAIMS

The present application claim priority to U.S. Provisional Patent Application Ser. No. 61/644,622 filed on May 9, 2012 and entitled "METHOD AND APPARATUS FOR TRACKING EXTRA DATA PERMISSIONS IN AN INSTRUCTION CACHE," which is incorporated herein by reference in its entirety.

BACKGROUND

I. Field of the Disclosure

The technology of the disclosure relates generally to an instruction cache for a processor.

II. Background

Commonly owned and assigned U.S. Pat. No. 7,337,272 teaches, among other things, an instruction cache 10 for a processor, where the instruction cache 10 includes extended cache lines 12-0 through 12-NUM$_{ECL}$, as illustrated in FIG. 1. The extended cache lines 12-0 through 12-NUM$_{ECL}$ are generally referred to herein collectively as the extended cache lines 12 and individually as the extended cache line 12. As illustrated, each of the extended cache lines 12 includes a main cache line portion 14 and an extra data portion 16. The main cache line portion 14 stores a predefined number of words (e.g., 16 words or 64 bytes) and operates to cache instruction data from a line of memory. The extra data portion 16 of each extended cache line 12 is located at the end of the extended cache line 12 and is a copy of instruction data at a start of a next line of memory, which may also be a copy of a start of the next extended cache line 12. So, for example, assume that the main cache line portion 14 of the extended cache line 12-0 caches instruction data from a first line of memory and the main cache line portion 14 of the extended cache line 12-1 caches instruction data from a second line of memory that immediately follows the first line of memory. In this example, the extra data portion 16 of the extended cache line 12-0 stores a copy of the instruction data at the start of the main cache line portion 14 of the extended cache line 12-1. Notably, the main cache line portions 14 and the extra data portions 16 of the extended cache lines 12 may be implemented within the same physical resource (i.e., part of the same physical cache memory) or implemented within separate physical resources.

The instruction cache 10 having the extended cache lines 12 is particularly beneficial in processors that allow variable length instructions (e.g., processors that allow both 16-bit and 32-bit instructions). Variable length instructions result in instructions that are not word-aligned (i.e., non-word-aligned instructions). Further, variable length instructions result in instructions that cross line boundaries in the instruction cache, which are referred to herein as line-crossing instructions. For conventional instruction caches, fetching a line-crossing instruction from the instruction cache requires two separate fetch operations, namely, a first fetch to obtain a first portion of the instruction from a first cache line, and second fetch to obtain a second portion of the instruction from a second cache line. In contrast, the instruction cache 10 having the extended cache lines 12 enables fetching of a line-crossing instruction using a single fetch operation from a single extended cache line 12.

As an example, consider an implementation where instructions can be either 16-bit instructions or 32-bit instructions, and lines of memory and thus the main cache line portion 14 of the extended cache lines are 16 words (i.e., 64 bytes). Due to the variable length instructions, there will be situations where the first 16-bits of a 32-bit instruction reside in one line of memory and the second 16-bits of the 32-bit instruction reside in the next line of memory. When caching the instruction in the instruction cache 10, the first 16-bits of the instruction are cached as the last 16-bits of the main cache line portion 14 of one of the extended cache lines 12, and a copy of the last 16-bits of the 32-bit instruction is cached in the extra data portion 16 of the same extended cache line 12. By storing a copy of the last 16-bits of the 32-bit instruction as extra data in the extra data portion 16 of the extended cache line 12, the full 32-bit instruction can be fetched using a single fetch of the extended cache line 12.

One issue with the instruction cache 10 is that a page-crossing instruction may span two pages of memory having different translation information (e.g., different execution permissions). More specifically, the instruction cache 10 is utilized to cache instruction data that resides in memory that is organized into a number of memory pages. A line-crossing instruction that crosses from a last line in one page of memory to a first line in another page of memory is referred to herein as a page-crossing instruction. When a page-crossing instruction is cached in the instruction cache 10, the first part of the page-crossing instruction is cached at the end of the main cache line portion 14 of one of the extended cache lines 12, and a copy of the last part of the page-crossing instruction is cached as extra data in the extra data portion 16 of the same extended cache line 12. As a result, the page-crossing instruction can be fetched from the instruction cache 10 using a single fetch from one extended cache line 12. As an example, FIG. 1 illustrates a page-crossing instruction having a first part (PCI(1)) that resides at the end of a last line of memory in one page of memory and is cached at the end of the main cache line portion 14 of the extended cache line 12-X, and a second part (PCI(2)) that resides at the start of a first line of memory in another page of memory and is cached at the start of the main cache line portion 14 of the extended cache line 12-(X+1). A copy of the second part (PCI(2)) of the page-crossing instruction is stored as extra data in the extra data portion 16 of the extended cache line 12-X. As such, the page-crossing instruction can then be fetched by fetching the extended cache line 12-X.

One issue that arises when dealing with page-crossing instructions is that a page-crossing instruction fetched from a single extended cache line 12 may have a first part that resides in one page of memory having certain page attributes (e.g., certain execution permissions) and a second part that resides in a different page of memory having different page attributes (e.g., different execution permissions). For example, the first part (PCI(1)) of the page-crossing instruction cached in the extended cache line 12-X may reside in a page of memory that has different execution permissions than the page of memory in which the second part (PCI(2)) resides. Therefore, systems and methods are needed to process page-crossing instructions obtained from an instruction cache having extended cache lines.

SUMMARY OF THE DISCLOSURE

Systems and methods are disclosed for maintaining an instruction cache including extended cache lines and page attributes for main cache line portions of the extended cache lines and, at least for one or more predefined potential page-crossing instruction locations, additional page attributes for extra data portions of the corresponding extended cache lines. In addition, systems and methods are disclosed for processing page-crossing instructions fetched from an instruction cache having extended cache lines.

In one embodiment, a processor fetches a page-crossing instruction from a single extended cache line in an instruction cache, where a first part of the page-crossing instruction resides in a first page of memory and is cached at an end of a main cache line portion of the extended cache line and a second part of the page-crossing instruction resides in a second page of memory and is cached as extra data in an extra data portion of the extended cache line. The processor detects that the page-crossing instruction is prohibited from executing based on one or more page attributes (e.g., execution permissions for one or more processing modes) associated with the second page of memory. In one particular embodiment, if one or more page attributes for the first page of memory (e.g., execution permissions for one or more processing modes) allow execution and the one or more page attributes for the second page of memory prohibit execution, then the processor detects that the page-crossing instruction is prohibited from executing.

In one embodiment, in response to detecting that the page-crossing instruction is prohibited from executing, the processor reports that execution of the page-crossing instruction is prohibited.

In one embodiment, a processor includes an instruction cache having extended cache lines. When caching a last line of memory in a first page of memory, the processor caches the last line of memory in a main cache line portion of an extended cache line and caches one or more page attributes for the first page of memory in a resource of the instruction cache. In addition, the processor caches extra data that resides at a start of a first line of memory in a second, or next, page of memory as extra data in an extra data portion of the extended cache line and caches one or more page attributes for the second page of memory in a resource of the instruction cache.

In another embodiment, a processor includes an instruction cache having extended cache lines. When caching a last line of memory in a first page of memory, the processor caches the line of memory in a main cache line portion of an extended cache line and caches one or more page attributes for the first page of memory in a resource of the instruction cache. In addition, the processor requests one or more attributes for a second, or next, page of memory. If a non-permission based fault is returned, the processor creates one or more overloaded page attributes that indicate that execution is not permitted and caches the one or more overloaded page attributes in association with an extra data portion of the extended cache line. If one or more page attributes for the second page of memory are returned, the processor caches extra data that resides at a start of a first line of memory in the second page of memory as extra data in the extra data portion of the extended cache line and caches the one or more page attributes for the second page of memory in a resource of the instruction cache.

In another embodiment, a processor includes an instruction cache having extended cache lines. For each extended cache line, the instruction cache stores one or more page attributes for a page of memory in which instruction data cached in a main cache line portion of the extended cache line resides. In addition, for each and only each extended cache line that is predefined as a potential page-crossing instruction location, the instruction cache further stores one or more additional page attributes. In one embodiment, the one or more additional page attributes are one or more page attributes for a page of memory in which extra data stored in an extra data portion of the extended cache line resides. In another embodiment, the one or more additional page attributes are either one or more page attributes for a page of memory in which extra data stored in an extra data portion of the extended cache line resides or one or more overloaded page attributes created in response to a non-permission type fault that occurred when attempting to obtain one or more page attributes for a page of memory in which extra data to be stored in the extra data portion of the extended cache line would otherwise reside.

BRIEF DESCRIPTION OF THE FIGURES

FIG. 4A is a block diagram of the extended data array of the instruction cache of FIG. 3 according to one embodiment of the present disclosure;

FIG. 4C is a block diagram of the additional resource for extra data page attributes for potential page-crossing instruction location(s) in the instruction cache of FIG. 3 according to one embodiment of the present disclosure;

DETAILED DESCRIPTION

Figure 1:
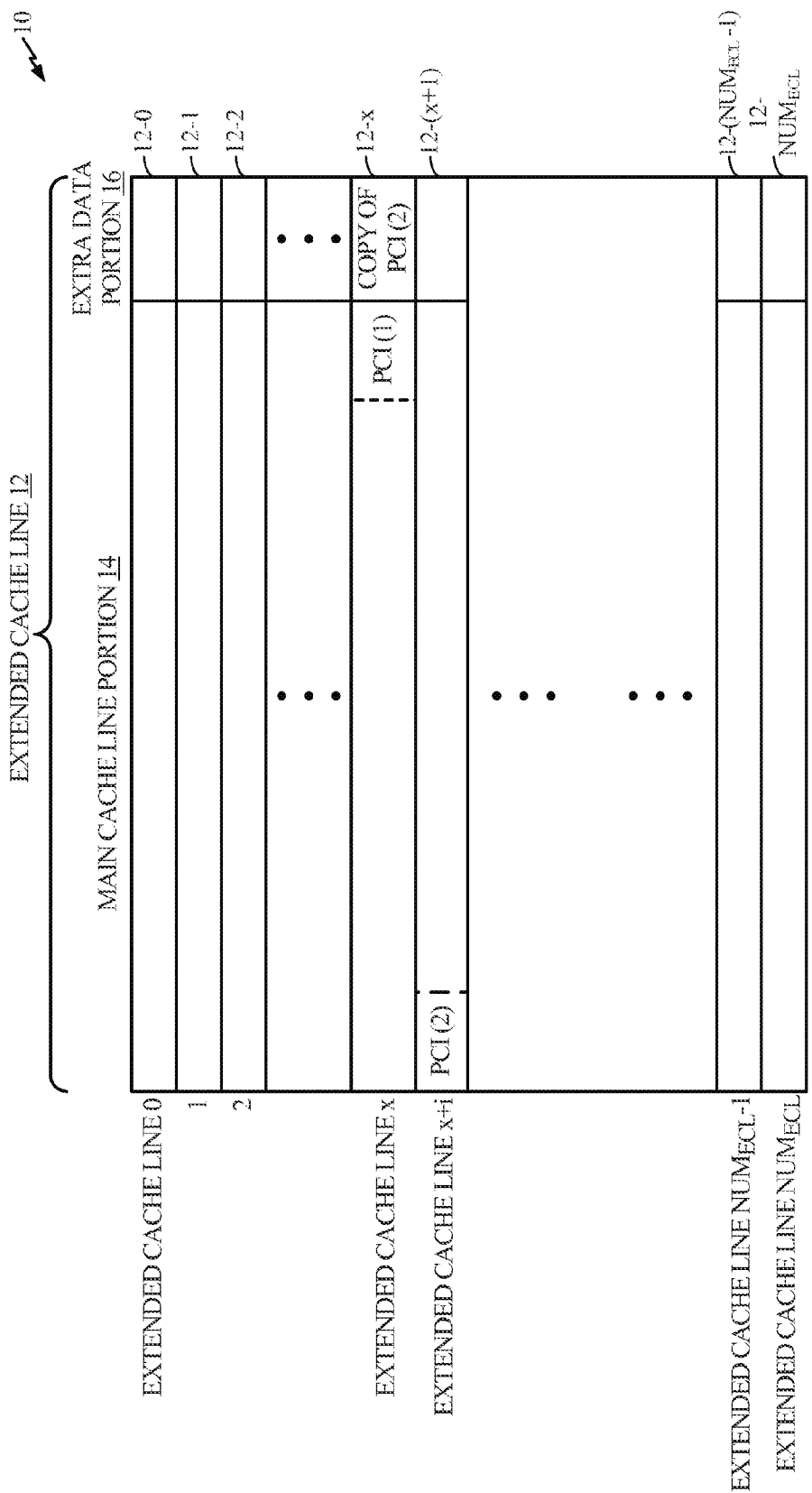
FIG. 1 is a functional block diagram of an instruction cache for a processor, where the instruction cache includes extended cache lines according to the prior art.

With reference now to the drawing figures, several exemplary embodiments of the present disclosure are described. The word "exemplary" is used herein to mean "serving as an example, instance, or illustration." Any embodiment described herein as "exemplary" is not necessarily to be construed as preferred or advantageous over other embodiments.

Systems and methods are disclosed for maintaining an instruction cache including extended cache lines and page attributes for main cache line portions of the extended cache lines and, at least for one or more predefined potential page-crossing instruction locations, additional page attributes for extra data portions of the corresponding extended cache lines. In addition, systems and methods are disclosed for processing page-crossing instructions fetched from an instruction cache having extended cache lines.

Figure 2:
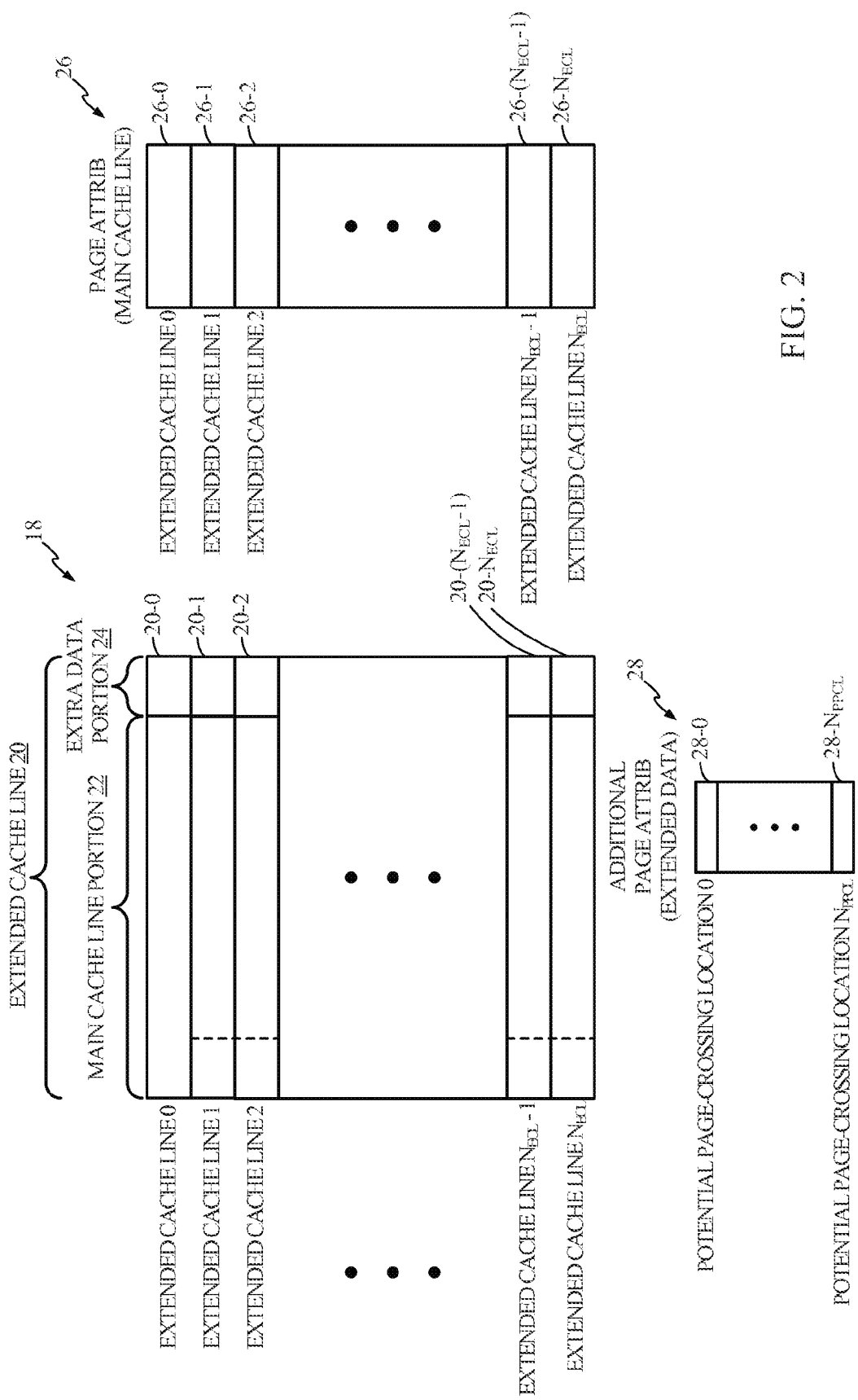
FIG. 2 is a functional block diagram of an instruction cache for a processor, where the instruction cache stores page attributes for a main cache line portion and an extra data portion of extended cache lines that potentially include page-crossing instructions according to one embodiment of the present disclosure.

In this regard, FIG. 2 illustrates an instruction cache 18 for a processor according to one embodiment of the present disclosure. As illustrated, the instruction cache 18 includes extended cache lines 20-0 through 20-$N_{ECL}$ (generally referred to herein collectively as the extended cache lines 20 and individually as the extended cache line 20), where the number of extended cache lines 20 is equal to $N_{ECL}$+1. Each of the extended cache lines 20 includes a main cache line portion 22 and an extra data portion 24. In addition, the instruction cache 18 includes page attributes 26-0 through 26-$N_{ECL}$ (generally referred to herein collectively as the page attributes 26 and individually as the page attributes 26) for the main cache line portions 22 of the corresponding extended cache lines 20-0 through 20-$N_{ECL}$, and additional page attributes 28-0 through 28-$N_{PPCL}$ (generally referred to herein as collectively as the additional page attributes 28 and individually as the additional page attributes 28) for a number of potential page-crossing instruction locations ($N_{PPCL}$+1) in the instruction cache 18, where the number of potential page-crossing instruction locations is greater than or equal to 1. The instruction cache 18 preferably caches a mixture of variable length instructions (e.g., a mixture of 16-bit and 32-bit instructions) from higher-level cache or main memory.

More specifically, the main cache line portions 22 of the extended cache lines 20 cache instruction data from corresponding lines of main memory, where the main memory is organized into a number of memory pages. So, instruction data cached in the main cache line portion 22 of one of the extended cache lines 20 is instruction data from a line of memory in one of the pages of memory. The instruction data is referred to herein as being cached by the instruction cache 18 but as residing in, or primarily stored in, the main memory. The extra data portion 24 of each of the extended cache lines 20 stores a copy of a beginning portion of a line of memory that immediately follows the line of memory in which the instruction data in the main cache line portion 22 of the same extended cache line 20. So, the main cache line portion 22 of one of the extended cache lines 20 caches instruction data from one line of memory, and the extra data portion 24 of the extended cache line 20 caches extra data from a beginning of the next line of memory. Assuming that two consecutive lines of memory are cached in the extended cache lines 20-0 and 20-1, the extra data portion 24 of the extended cache line 20-0 stores a copy of the beginning portion of the main cache line portion 22 of the extended cache line 20-1. In one exemplary embodiment, the main cache line portions 22 of the extended cache lines 20 are 64-bytes each, or 16 words each, and the extra data portions 24 of the extended cache lines 20 are 16-bits each, or one half word each.

The page attributes 26 are attributes of pages of memory for the main cache line portions 22 of the corresponding extended cache lines 20. More specifically, for each extended cache line 20, the page attributes 26 for the main cache line portion 22 of the extended cache line 20 are one or more page attributes for a page of memory in which the instruction data cached in the main cache line portion 22 resides. Thus, for example, the page attributes 26-0 are attributes of a page of memory from which the line of instruction data cached in the main cache line portion 22 of the extended cache line 20-0 was obtained, which is referred to herein as the page of memory in which the instruction data resides. The page attributes 26 preferably include execution permissions for the corresponding pages of memory, and, in one particular embodiment, are or include a user execution permission (UX) and a privileged execution permission (PX).

The additional page attributes 28 are preferably stored for only a predefined number of potential page-crossing instruction locations in the instruction cache 18. Each potential page-crossing instruction is one of the extended cache lines 20 that may store a page-crossing instruction that spans an end of the main cache line portion 22 of the extended cache line 20 and crosses over into the extra data portion 24 of the extended cache line 20. In one exemplary embodiment, a page size of the pages of memory is 4 Kilobytes (KB), and the instruction cache 18 is an N-way set associative cache having 64 sets numbered set 0 through set 63. As such, the potential page-crossing instruction locations correspond to set 63 of the instruction cache 18. In other words, the potential page-crossing instruction locations are found at lines 63, 127, 191, 255, etc. of memory, all of which are cached only in set 63 of the instruction cache 18. Therefore, only set 63 of the instruction cache 18 contains potential page-crossing instruction locations, and the additional page attributes 28 are stored only for the extra data portions 24 of the extended cache lines 20 in set 63 of the instruction cache 18. Note, however, that this is only one example. The potential page-crossing instruction locations will vary depending on the particular implementation of the instruction cache 18.

The additional page attributes 28 are generally page attributes for the pages of memory from which the extra data portions 24 of the corresponding extended cache lines 20 were obtained, which are referred to herein as the pages of memory in which the instruction data in the extra data portions 24 of those extended cache lines 20 resides. The additional page attributes 28 preferably include execution permissions for the corresponding pages of memory, and, in one particular embodiment, are or include a UX and a PX. Further, as discussed below, the UX and PX for the extra data portions 24 of the corresponding extended cache lines 20 may, in some embodiments, be overloaded with values that indicate a lack of permission to execute in both user mode and privileged mode in response to a non-permission type fault received when attempting to fill the extra data portions 24 such as, for example, a page translation fault when using dynamic paging.

Figure 3:
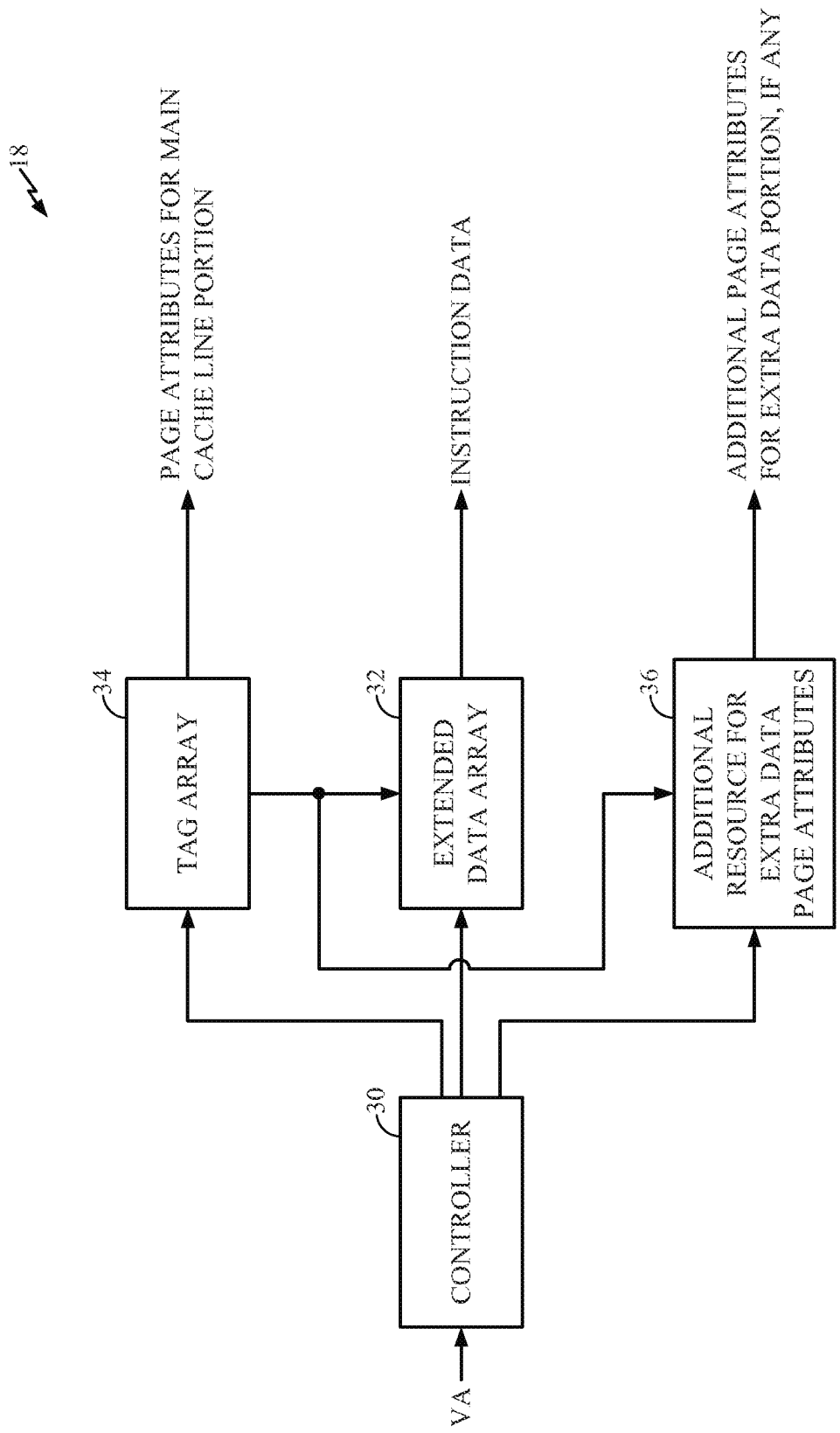
FIG. 3 is a block diagram of the instruction cache of FIG. 2 according to one embodiment of the present disclosure.

FIG. 3 illustrates a block diagram of the instruction cache 18 of FIG. 2 according to one embodiment of the present disclosure. As illustrated, the instruction cache 18 includes a controller 30, an extended data array 32 that stores the extended cache lines 20, a tag array 34 that stores, among other things, the page attributes 26 for the main cache line portions 22 of the extended cache lines 20, and an additional resource 36 that stores page attributes for the extra data portions 24 of the extended cache lines 20 that are potential page-crossing instruction locations. As discussed below in detail, when an instruction is fetched from the instruction cache 18, a virtual address (VA) is input to the controller 30. The controller 30 then controls the tag array 34, the extended data array 32, and the additional resource 36 such that the instruction cache 18 outputs a predefined amount of instruction data (e.g., 4 words) stored in the instruction cache 18 for addresses starting at the virtual address, the page attributes 26 for the main cache line portion 22 of the corresponding extended cache line 20, and, if the corresponding extended cache line 20 is a potential page-crossing instruction location, the additional page attributes 28 for the extra data portion 24 of the corresponding extended cache line 20.

In the exemplary embodiment discussed below, the instruction cache 18 is an N+1 way set associative cache having M+1 sets. In this exemplary embodiment, the controller 30 receives the virtual address, where the virtual address includes a tag, a set, and an offset. As a non-limiting example, the virtual address may be a 32-bit virtual address where bits 0 through 5 are the offset, bits 6 through 11 are the set, and bits 12 through 31 are the tag. As will be appreciated by one having ordinary skill in the art, the 20-bit tag identifies one of approximately 1 million 4 KB blocks of memory addressed by the virtual address, the 6-bit set identifies one of 64 sets of memory lines in the 4 KB of memory addressed by the virtual address, and the 6-bit offset identifies one of 64 bytes in the set addressed by the virtual address. Upon receiving the virtual address, the controller 30 outputs the tag and the set to the tag array 34 and the set and the offset to the extended data array 32. In addition, if the virtual address corresponds to one of the potential page-crossing instruction locations, the controller 30 outputs the set or an appropriate control signal derived from the set to the additional resource 36. As discussed below, using the tag and the set, the tag array 34 outputs one of the N+1 ways of the instruction cache 18 in which the addressed instruction data is stored as well as the page attributes 26 for the main cache line portion 22 of the extended cache line 20 cached in the corresponding set and way of the extended data array 32. Then, using the set and offset from the virtual address and the way output by the tag array 34, the extended data array 32 outputs the instruction data cached by the extended data array 32 for the virtual address. Lastly, if the virtual address corresponds to one of the potential page-crossing instruction locations, the additional resource 36 outputs the additional page attributes 28 for the extra data portion 24 of the extended cache line 20 that corresponds to the potential page-crossing instruction location.

Figure 4B:
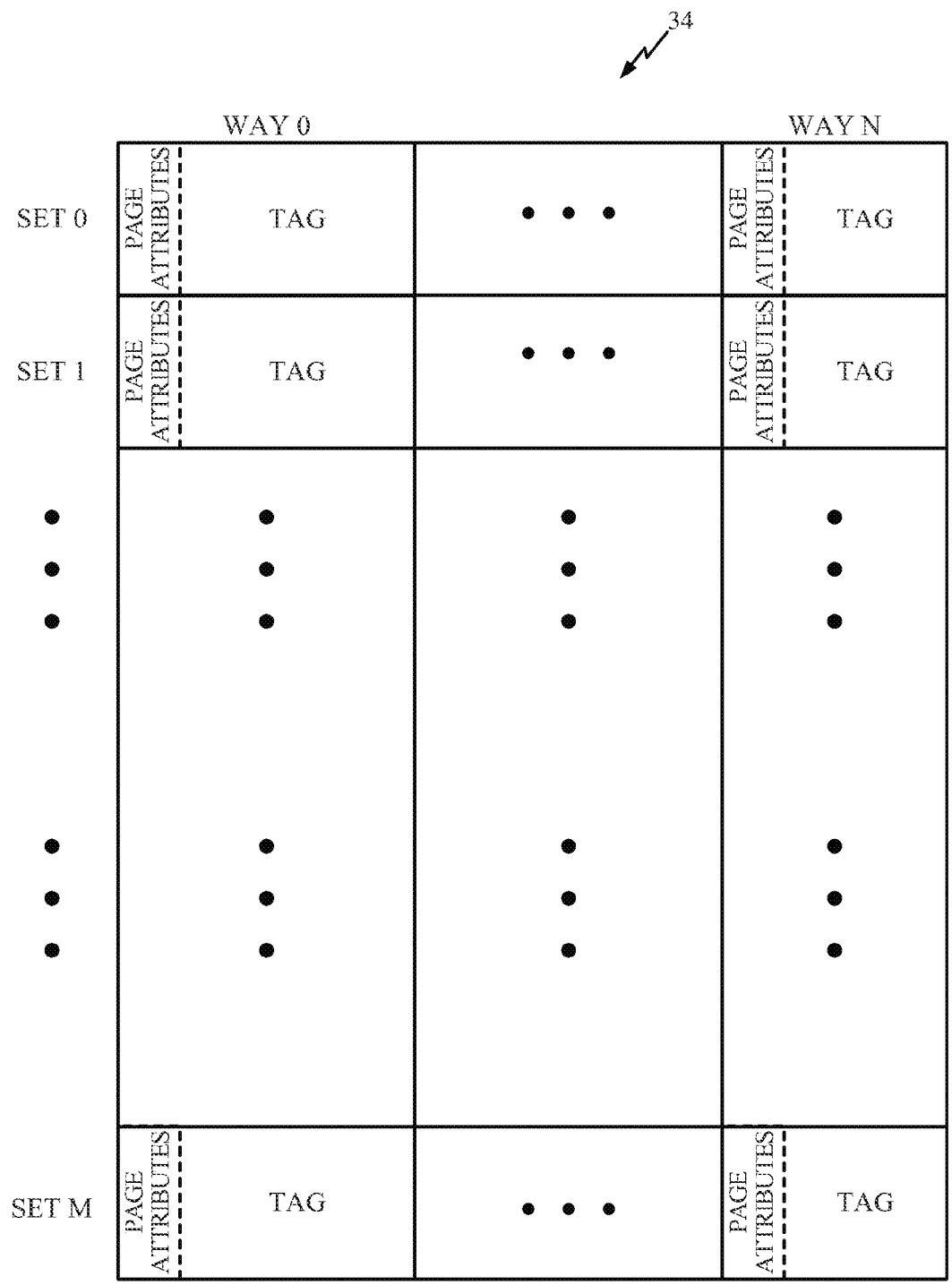
FIG. 4B is a block diagram of the tag array of the instruction cache of FIG. 3 according to one embodiment of the present disclosure.

FIGS. 4A through 4C illustrate the extended data array 32, the tag array 34, and the additional resource 36 of FIG. 3 in more detail according to one embodiment of the present disclosure. In this embodiment, the instruction cache 18 is an N+1 way set associative cache having M+1 sets. However, the instruction cache 18 may alternatively be direct-mapped or fully associative. As illustrated in FIG. 4A, the extended data array 32 stores a number of extended cache lines 20 organized into M+1 sets with N+1 ways per set. So, for each set, the extended data array 32 includes N+1 extended cache lines 20. As discussed above, each extended cache line 20 includes the main cache line portion 22 and the extra data portion 24. Note that while in this embodiment both the main cache line portions 22 and the extra data portions 24 of the extended cache lines 20 are implemented in the extended data array 32, the instruction cache 18 is not limited thereto. The main cache line portions 22 and the extra data portions 24 may alternatively be implemented in separate resources.

FIG. 4B illustrates the tag array 34 of FIG. 3 in more detail according to one embodiment of the present disclosure. As illustrated, the tag array 34 stores a number of tag entries organized into M+1 sets with N+1 ways per set. So, for each set, the tag array 34 includes N+1 tag entries. Each tag entry includes a tag and the page attributes 26 of a corresponding extended cache line 20 in the extended data array 32. More specifically, as an example, the tag entry for set 0, way 0 includes: (1) the tag of the virtual address for the line of memory cached in the main cache line portion 22 of the extended cache line 20 cached at set 0, way 0 in the extended data array 32 and (2) the page attributes 26 (e.g., UX and PX) for the page of memory in which the line of memory cached in the main cache line portion 22 of the extended cache line 20 at set 0, way 0 resides. In operation, when a tag and set from a virtual address are input into the tag array 34, the tags in the tag entries in the set are compared to the tag from the virtual address. If there is a match, the way for the matching tag entry is output by the tag array 34. Using the way output by the tag array 34 along with the set and offset from the virtual address, the desired instruction data can be obtained from the extended data array 32.

FIG. 4C illustrates the additional resource 36 of FIG. 3 in more detail according to one embodiment of the present disclosure. As illustrated, the additional resource 36 stores the additional page attributes 28 for the potential page-crossing instruction locations. In this particular embodiment, all of the potential page-crossing instruction locations are located in set M. For example, if the size of each of the pages of memory is 4 KB or an integer multiple of 4 KB, the number of sets (M+1) is 64 where the sets are number set 0 through set M, and each set includes N+1 64-byte memory lines, then all potential page crossing locations occur in set 63. As such, in operation, if the set in the virtual address input to the instruction cache 18 is set 63, the way output by the tag array 34 is input to the additional resource 36, which in turn outputs the additional page attributes (e.g., UX and PX) cached for the extended cache line 20 stored in the way output by the tag array 34 for set M.

Figure 5:
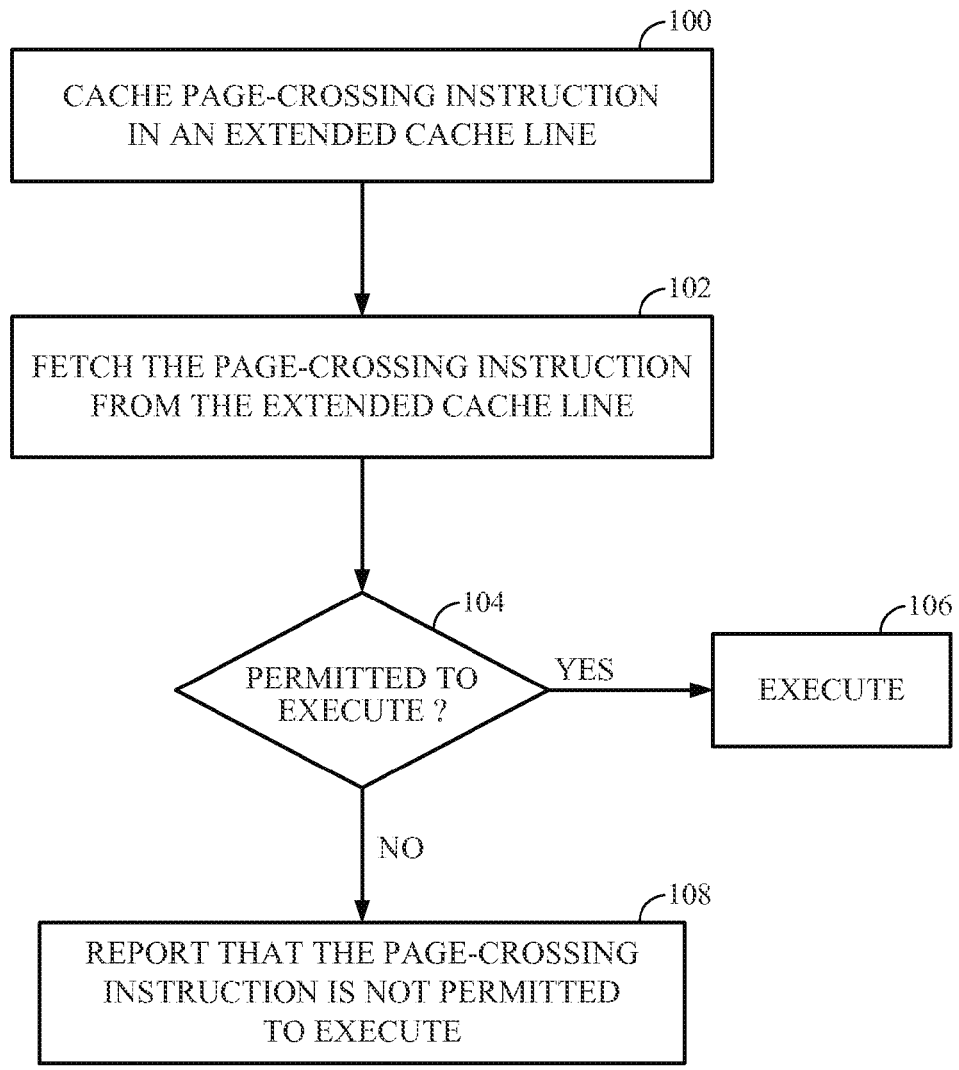
FIG. 5 is a flow chart that illustrates the operation of a processor to utilize the instruction cache of FIGS. 2 and 3 according to one embodiment of the present disclosure.

FIG. 5 illustrates the operation of a processor to utilize the instruction cache 18 according to one embodiment of the present disclosure. First, the processor caches a page-crossing instruction in a single extended cache line 20 of the instruction cache 18 (step 100). As discussed above, a first part of the page-crossing instruction resides at the end of a last line of memory in one page of memory and is cached in the main cache line portion 22 of the extended cache line 20. A second part of the page-crossing instruction resides at the beginning of a first line of memory in a next page of memory. A copy of the second part of the page-crossing instruction is cached as extra data in the extra data portion 24 of the extended cache line 20. Notably, the second part of the page-crossing instruction may be cached at the beginning of the main cache line portion 22 of the next extended cache line 20, and, in this case, the extra data portion 24 of the extended cache line 20 is a copy of the beginning of the main cache line portion 22 of the next extended cache line 20.

At some time subsequent to caching the page-crossing instruction in the extended cache line 20, the processor fetches the page-crossing instruction from the extended cache line 20 (step 102). The processor then determines whether the page-crossing instruction is permitted to execute based on both the page attributes 26 of the main cache line portion 22 of the extended cache line 20 as well as the additional page attributes 28 for the extra data portion 24 of the extended cache line 20 (step 104). More specifically, in the one preferred embodiment, the page attributes 26 are UX and PX permissions for the main cache line portion 22 of the extended cache line 20, and the additional page attributes 28 are UX and PX permissions for the extra data portion 24 of the extended cache line 20. If the processor is currently operating in a user mode, the processor determines that the page-crossing instruction is permitted to execute if both the UX for the main cache line portion 22 and the UX for the extra data portion 24 are set to values that indicate that execution of the page-crossing instruction is permitted for the user mode. Otherwise, if either the UX for the main cache line portion 22 or the UX for the extra data portion 24 is set to a value that indicates that execution is not permitted for the user mode, the processor determines that execution of the page-crossing instruction is not permitted for the user mode. Similarly, if the processor is currently operating in a privileged mode, the processor determines that the page-crossing instruction is permitted to execute if both the PX for the main cache line portion 22 and the PX for the extra data portion 24 are set to values that indicate that execution of the page-crossing instruction is permitted for the privileged mode. Otherwise, if either the PX for the main cache line portion 22 or the PX for the extra data portion 24 is set to a value that indicates that execution is not permitted for the privileged mode, the processor determines that execution of the page-crossing instruction is not permitted for the privileged mode.

If the page-crossing instruction is permitted to execute, then the processor executes the page-crossing instruction (step 106). If the page-crossing instruction is not permitted to execute, the processor does not execute the page-crossing instruction and, in some embodiments, reports that the page-crossing instruction is prohibited from executing (step 108). For example, the processor may report a pre-fetch abort to an exception handler of an operating system being executed by the processor.

Figure 6:
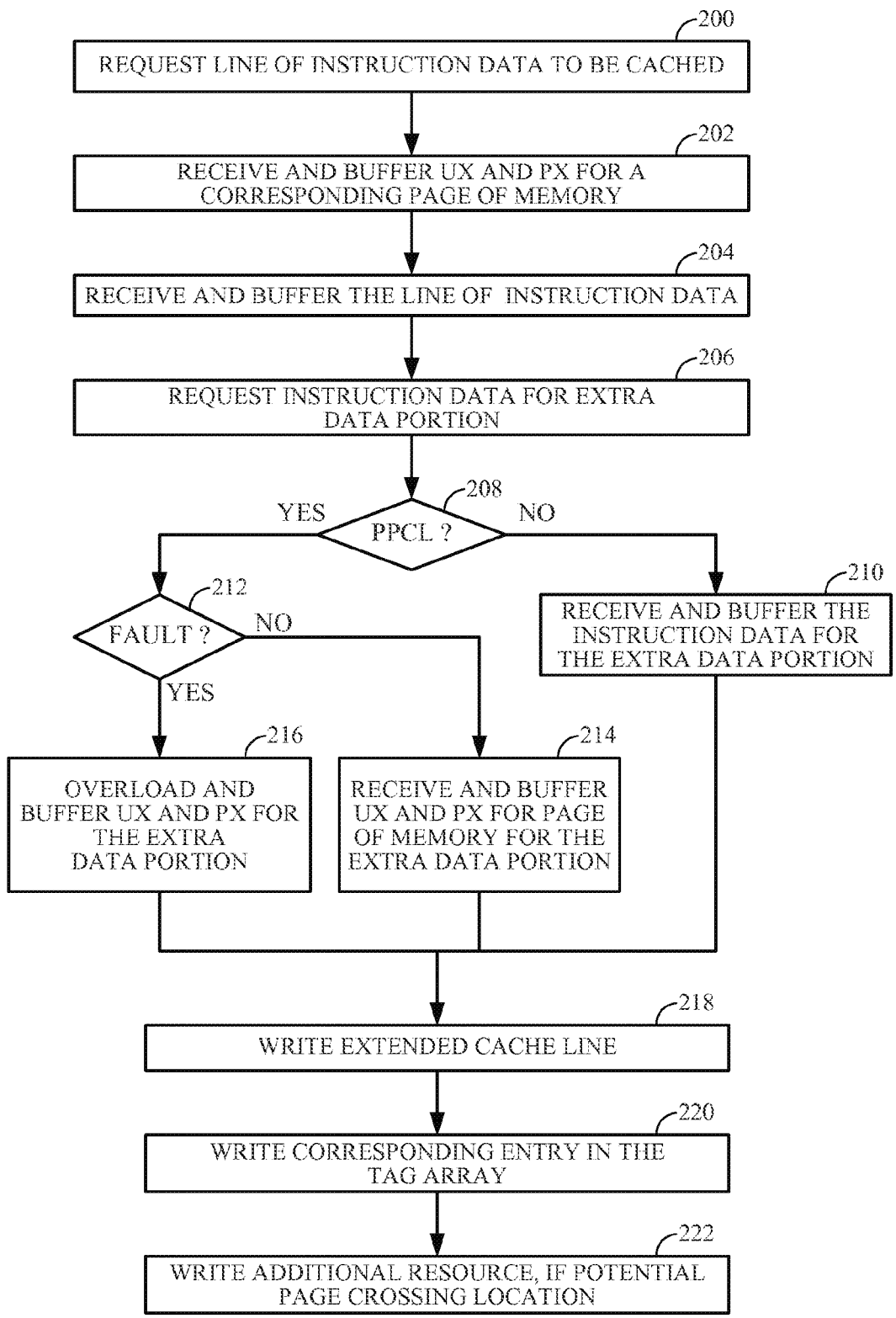
FIG. 6 is a flow chart that illustrates a process for filling the instruction cache of FIGS. 2 and 3 according to one embodiment of the present disclosure.

FIG. 6 is a flow chart illustrating a process for caching instruction data in one of the extended cache lines 20 of the instruction cache 18 according to one embodiment of the present disclosure. First, the instruction cache 18, and in one particular embodiment the controller 30 of the instruction cache 18, requests a line of instruction data to be cached in the main cache line portion 22 of one of the extended cache lines 20 from higher level cache or main memory (step 200). Notably, if there is a fault when requesting the line of instruction data to be cached in the main cache line portion 22 of the extended cache line 20, the line is not cached, the fault is reported, and the process ends. Assuming that there is no fault, in response to the request for the line of instruction data, the instruction cache 18 receives and buffers the page attributes 26 for the page of memory in which the requested instruction data resides, which for the discussion of FIG. 6 are UX and PX permissions for the page of memory in which the requested instruction data resides (step 202). In addition, the instruction cache 18 receives and buffers the requested line of instruction data (step 204).

The instruction cache 18, and in one particular embodiment the controller 30 of the instruction cache 18, requests instruction data to be cached in the extra data portion 24 of the extended cache line 20 (step 206). For example, if a size of the extra data portion 24 is a half-word, the instruction cache 18 requests the first half-word of instruction data from the next line of memory. The instruction cache 18 determines whether the line of memory in which the line of instruction data requested in step 200 resides is a potential page-crossing instruction location (step 208). If not, the instruction cache 18 receives and buffers the requested instruction data for the extra data portion 24 of the extended cache line 20 (step 210).

Returning to step 208, if the line of memory in which the instruction data requested in step 200 resides is a potential page-crossing instruction location, then the instruction cache 18 determines whether a fault was received in response to the request in step 206 for data for the extra data portion 24 of the extended cache line 20 (step 212). If not, the instruction cache 18 receives and buffers the additional page attributes 28 for the extra data portion 24 of the extended cache line 20, which for the discussion of FIG. 6 are UX and PX permissions for the page of memory in which the instruction data for the extra data portion 24 resides (step 214). Otherwise, if a fault was returned in response to the request in step 206 for data for the extra data portion 24 of the extended cache line 20, the instruction cache overloads and buffers UX and PX permissions for the extra data portion 24 of the extended cache line 20 (step 216). As used herein, overloaded UX and PX permissions are UX and PX permissions set to values that indicate that execution is not permitted in user mode and is not permitted in privileged mode. For example, in one particular embodiment, dynamic paging is used to allocate pages of memory. In the event that the page in which the next line of memory resides has not yet been allocated, a page translation fault may be returned to the instruction cache 18 in response to the request in step 206. In response, since the actual UX and PX permissions for the yet to be allocated page of memory are not known, the instruction cache 18 creates and buffers overloaded UX and PX permissions for the extra data portion 24 of the extended cache line 20, where again the overloaded UX and PX permissions indicate that execution is not permitted for user mode and is not permitted for privileged mode.

At this point, whether proceeding from step 210, 214, or 216, the instruction cache 18 writes a select one of the extended cache lines 20 with the buffered instruction data (step 218). More specifically, the instruction cache 18 writes the instruction data received and buffered in step 202 to the main cache line portion 22 of the extended cache line 20. In addition, if instruction data is received and buffered for the extra data portion 24 in step 214, the instruction cache 18 writes the instruction data received and buffered in step 214 to the extra data portion 24 of the extended cache line 20. For the N+1 way set associative embodiment of the instruction cache 18 described above, the extended cache line 20 to which the instruction data is written is one of the N+1 extended cache lines 20 in a corresponding set of extended cache lines 20 in the instruction cache 18.

In addition, the instruction cache 18 writes a corresponding tag entry in the tag array 34 of the instruction cache 18 (step 220). More specifically, for the N+1 way set associative embodiment of the instruction cache 18 described above, the instruction cache 18 writes the tag for the virtual address of the line of memory cached in the extended cache line 20 and the UX and PX permissions for the main cache line portion 22 of the extended cache line 20 to the tag entry for the appropriate set and way. Lastly, if the line of memory being cached is a potential page-crossing instruction location, the instruction cache 18 writes the additional UX and PX permissions either received and buffered in step 214 or overloaded and buffered in step 216 to the appropriate location in the additional resource 36 that stores the additional page attributes 28 for the extra data portions 24 of the extended cache lines 20 that are potential page-crossing instruction locations (step 222).

Figure 7:
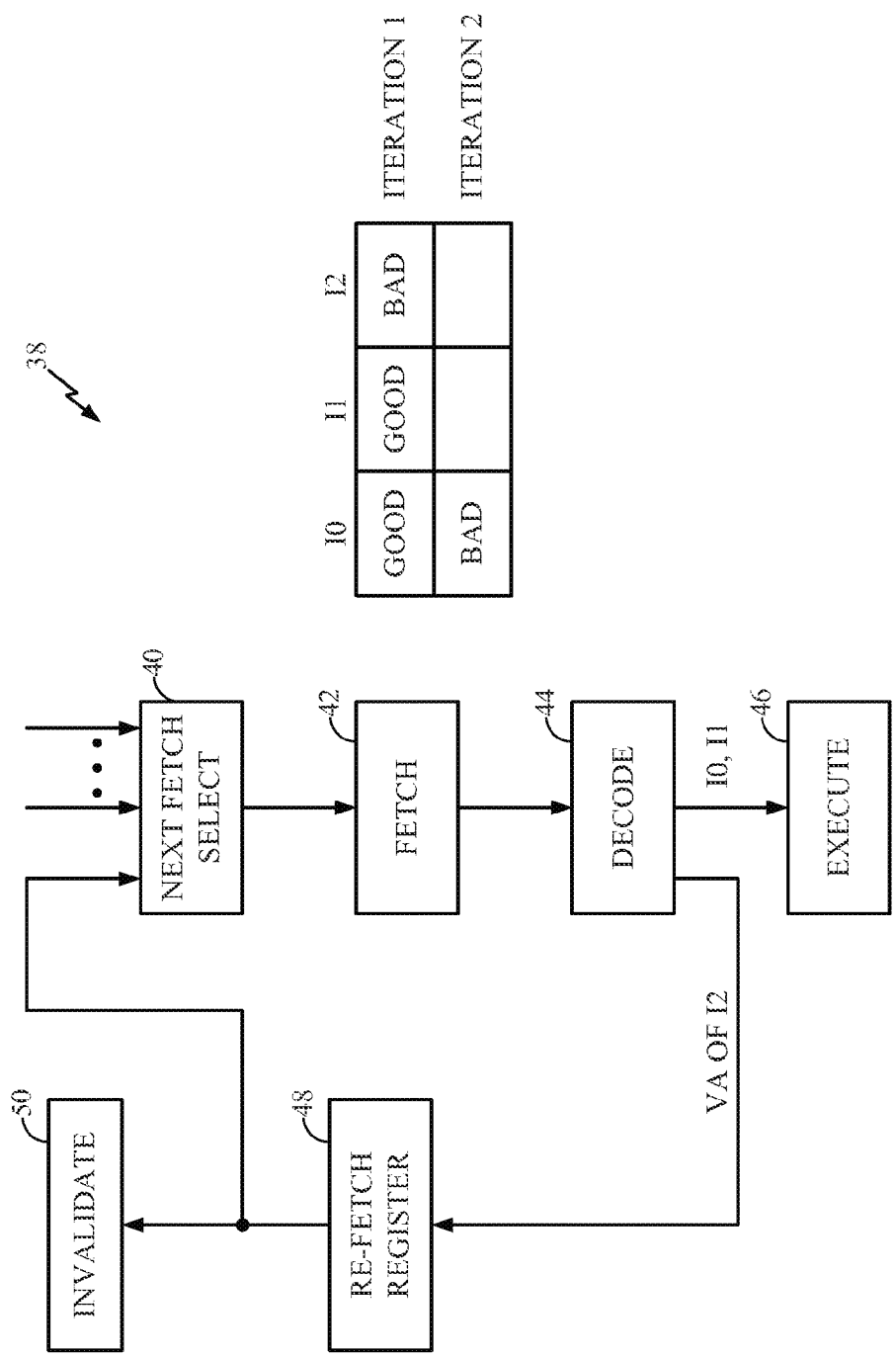
FIG. 7 illustrates a processor including fetch, decode, and execute logic that processes instructions, including page-crossing instructions, fetched from the instruction cache of FIGS. 2 and 3 according to one embodiment of the present disclosure.

While FIG. 6 illustrates a process for caching instruction data in the instruction cache 18, FIG. 7 illustrates a pipeline 38 of a processor that operates to fetch, decode, and execute instructions from the instruction cache 18 according to one embodiment of the present disclosure. Initially, next fetch select logic 40 selects a virtual address of the next instructions to fetch. Notably, the pipeline 38 is capable of processing multiple instructions in parallel. In one particular embodiment, each stage in the pipeline 38 has a width of three words (i.e., six half-words). In another particular embodiment, when operating in a mode that supports variable length instructions, each stage in the pipeline 38 has a width of either three words or two words. Note, however, that the width of the pipeline 38 may vary depending on the particular implementation. Once a virtual address is selected and output by the next fetch select logic 40, fetch logic 42 operates to fetch a predefined number of bytes of instruction data starting at the virtual address from the instruction cache 18. When fetching the instruction data from the instruction cache 18, the instruction cache 18 returns the predefined number of bytes of instruction data starting at the virtual address, the page attributes 26 for the main cache line portion 22 of the corresponding extended cache line 20, and, if applicable, the additional page attributes 28 of the extra data portion 24 of the corresponding extended cache line 20.

In this embodiment, decode logic 44 processes the instruction data to identify a number of instructions, which in this example are referred as instructions I0 through I2. Note that while three instructions are shown here, the pipeline 38 is not limited thereto. In this particular example, the decode logic 44 determines that the instructions I0 and I1 are not page-crossing instructions, whereas the instruction I2 is a page crossing-instruction. Further, the page attributes 26 and 28 are UX and PX permissions. In this embodiment, the decode logic 44 detects whether the instructions I0 through I2 are permitted to execute. However, it should be noted that detection logic for detecting whether the instructions I0 through I2 are permitted to execute may be implemented in the fetch logic 42 or the decode logic 44, depending on the particular implementation. More specifically, the decode logic 44 checks the UX and PX permissions returned for the main cache line portion 22 of the extended cache line 20 from which the instructions I0 through I2 were fetched. In this example, based on the current execution mode of the processor and the UX and PX permissions for the main cache line portion 22, the decode logic 44 determines that the instructions I0 and I1 are permitted to execute and, as such, the instructions I0 and I1 are flagged as "good." However, for the page-crossing instruction I2, the decode logic 44 also checks the UX and PX permissions for the extra data portion 24 of the corresponding extended cache line 20. In this example, based on the current execution mode of the processor and the UX and PX permissions for the extra data portion 24, the decode logic 44 determines that the page-crossing instruction I2 is not permitted to execute and, as such, flags the page-crossing instruction I2 as "bad." In this manner, a determination is made as to whether the page-crossing instruction is permitted to execute based on both the UX and PX permissions for the main cache line portion 22 and the UX and PX permissions for the extra data portion 24 of the corresponding extended cache line 20.

The decode logic 44 issues the instructions I0 and I1 to execute logic 46 for execution. However, since the page-crossing instruction I2 is flagged as "bad," the decode logic 44 does not issue the page-crossing instruction I2 to the execute logic 46. Rather, the decode logic 44 outputs a virtual address for the page-crossing instruction I2 to a re-fetch register 48 and then waits for the instructions I0 and I1 to complete execution. Once the instructions I0 and I1 have completed execution such that the "bad" page-crossing instruction I2 is the next instruction that is desired to be executed, the decode logic 44 triggers flushing of the pipeline 38 and the virtual address of the "bad" page-crossing instruction I2 is output from the re-fetch register 48 to both invalidate logic 50 and the next fetch select logic 40. The flushing of the pipeline 38 is performed by appropriate logic, which may be internal to or external to the decode logic 44. The invalidate logic 50 then invalidates the corresponding extended cache line 20 in the instruction cache 18 and the next fetch select logic 40 outputs the virtual address of the "bad" page-crossing instruction I2 to the fetch logic 42.

After the invalidation is complete, the fetch logic 42 attempts to re-fetch the page-crossing instruction from the instruction cache 18. Notably, now, the page-crossing instruction is an oldest instruction in the pipeline 38. Further, the pipeline 38 only allows instructions from the same extended cache line 20 to be processed in parallel, so no other instructions are proceeding through the pipeline 38 with the page-crossing instruction. When re-fetching the page-crossing instruction, since the corresponding extended cache line 20 has been invalidated, there is a miss in the instruction cache 18. This cache miss means that the "bad" page-crossing instruction has been removed from the corresponding extended cache line 20 in the instruction cache 18. Thus, unlike normal invalidate operations that invalidate only a main cache line, the invalidate operation performed by the invalidate logic 50 invalidates both the main cache line portion 22 and the extra data portion 24 of the extended cache line 20.

In response to the miss in the instruction cache 18, the page-crossing instruction is fetched either from higher level cache or main memory. Assuming that the higher-level cache or main memory has no concept of extended memory lines that are analogous to the extended cache lines 20, re-fetching of the page-crossing instruction includes both requesting the first part of the page-crossing instruction from the end of the corresponding line of memory and the second part of the page-crossing instruction from the beginning of the next line of memory. When the determination is again made that the page-crossing instruction is "bad" based either on the UX and PX permissions for the two corresponding pages of memory or in response to a non-permission type fault (e.g., a page translation fault) when fetching the second part of the page-crossing instruction, either the fetch logic 42 or the decode logic 44, as appropriate, reports a fault (i.e., either a permission fault or a non-permission type fault) to an exception handler of an operating system being executed by the processor. If there is a non-permission based fault type, the re-fetch process in effect obtains the actual non-permission based fault type represented by the previously overloaded UX and PX permissions for the second part of the page-crossing instruction. Specifically, the non-permission based fault type is obtained in response to attempting to fetch the second part of the page-crossing instruction, or more specifically in this embodiment, in response to requesting the page attributes of the corresponding page of memory. Notably, the fault is reported only when the decode logic 44 determines that the "bad" page-crossing instruction is the oldest instruction in the pipeline 38 (i.e., when it is known that instruction flow will not branch away from the "bad" page-crossing instruction). Once the permission based fault or non-permission based fault is reported, operation continues as dictated by the exception handler. For instance, the exception handler may correct the fault and then cause re-fetching of the instruction data, including the previously "bad" page-crossing instruction, and caching of the instruction data in the instruction cache 18.

The systems and methods for tracking and utilizing the additional page attributes 28 for the extra data portions 24 of the extended cache lines 20 of the instruction cache 18 according to embodiments disclosed herein may be provided in or integrated into any processor-based device. Examples, without limitation, include a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

Figure 8:
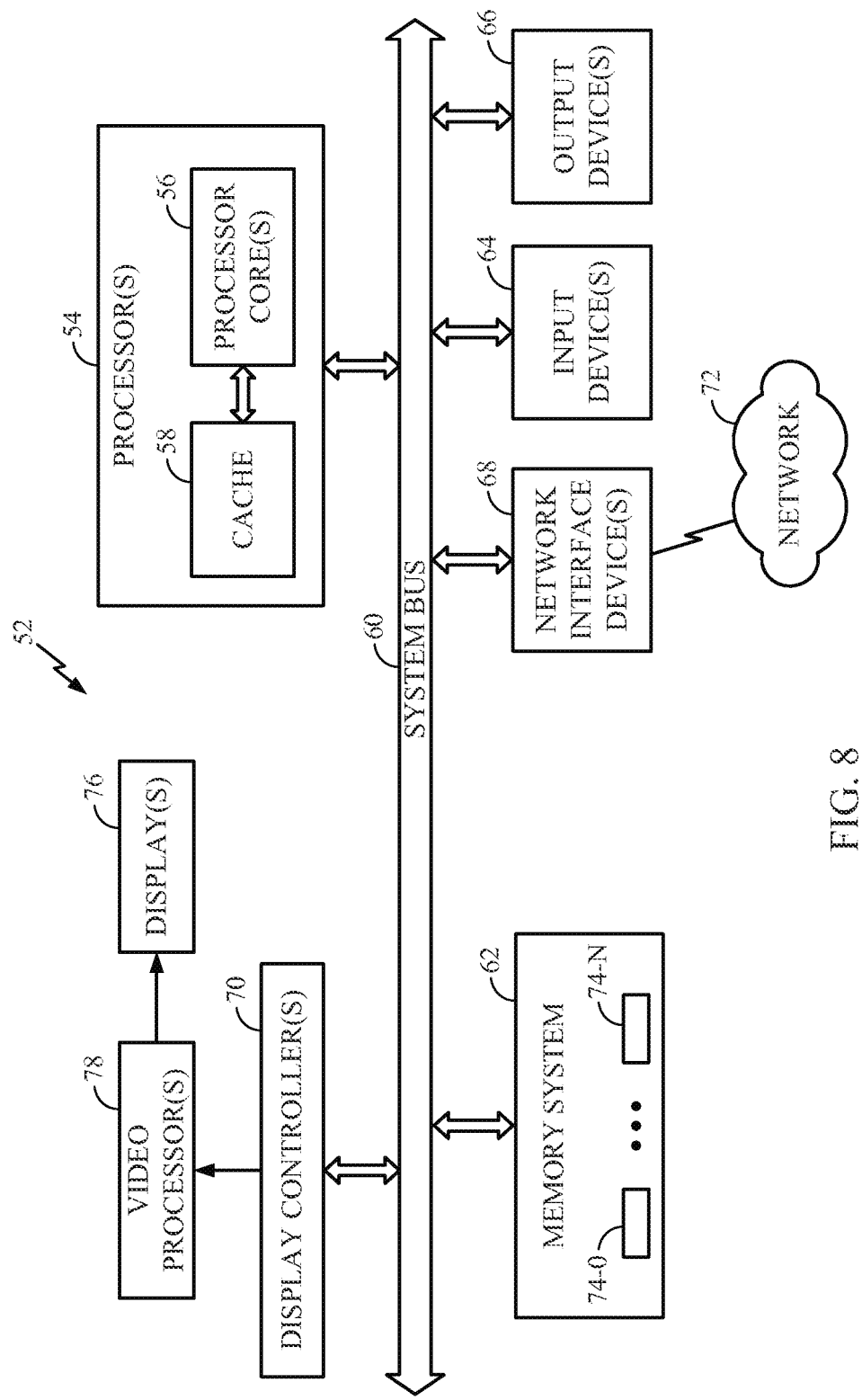
FIG. 8 is a block diagram of an exemplary processor-based system that can include the instruction cache of FIGS. 2 and 3 according to one embodiment of the present disclosure.

In this regard, FIG. 8 illustrates an example of a processor-based system 52 that can employ the instruction cache 18. In this example, the processor-based system 52 includes one or more processors 54, each including one or more processing cores 56. The processor(s) 54 may be a master device. The processor(s) 54 have cache memory 58, including the instruction cache 18, coupled to the processor core(s) 56 for rapid access to temporarily stored data. The processor(s) 54 is coupled to a system bus 60 and can intercouple master devices and slave devices included in the processor-based system 52. As is well known, the processor(s) 54 communicates with these other devices by exchanging address, control, and data information over the system bus 60. Although not illustrated in FIG. 8, multiple system buses 60 could be provided, wherein each system bus 60 constitutes a different fabric.

Other master and slave devices can be connected to the system bus 60. As illustrated in FIG. 8, these devices can include a memory system 62, one or more input devices 64, one or more output devices 66, one or more network interface devices 68, and one or more display controllers 70, as examples. The input device(s) 64 can include any type of input device, including but not limited to input keys, switches, voice processors, etc. The output device(s) 66 can include any type of output device, including but not limited to audio, video, other visual indicators, etc. The network interface device(s) 68 can be any devices configured to allow exchange of data to and from a network 72. The network 72 can be any type of network, including but not limited to a wired or wireless network, a private or public network, a local area network (LAN), a wide local area network (WLAN), and the Internet. The network interface device(s) 68 can be configured to support any type of communication protocol desired. The memory system 62 can include one or more memory units 74-0 through 74-N.

The processor(s) 54 may also be configured to access the display controller(s) 70 over the system bus 60 to control information sent to one or more displays 76. The display controller(s) 70 sends information to the display(s) 76 to be displayed via one or more video processors 78, which process the information to be displayed into a format suitable for the display(s) 76. The display(s) 76 can include any type of display, including but not limited to a cathode ray tube (CRT), a liquid crystal display (LCD), a plasma display, etc.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The master devices and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. It is to be understood that the operational steps illustrated in the flow chart diagrams may be subject to numerous different modifications as will be readily apparent to one of skill in the art. Those of skill in the art would also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method of operation of a processor comprising an instruction cache that comprises extended cache lines where each extended cache line comprises a main cache line portion and an extra data portion, comprising:
    caching a page-crossing instruction in a single extended cache line of the instruction cache, where a first part of the page-crossing instruction resides in a first page of memory and is cached in the main cache line portion of the extended cache line and a second part of the page-crossing instruction resides in a second page of memory and is cached in the extra data portion of the extended cache line;
    caching one or more memory page attributes for the main cache line portion of the extended cache line in association with the extended cache line, wherein the one or more memory page attributes for the main cache line portion of the extended cache line comprise one or more execution permissions for the first page of memory, each comprising a plurality of execution permission bits representing whether execution is permitted for a corresponding plurality of processing modes;
    caching one or more memory page attributes for the extra data portion of the extended cache line in association with the extended cache line, wherein the one or more memory page attributes for the extra data portion of the extended cache line comprise one or more execution permissions for the second page of memory, each comprising a plurality of execution permission bits representing whether execution is permitted for a corresponding plurality of processing modes;
    fetching the page-crossing instruction from the extended cache line; and
    detecting that the page-crossing instruction is prohibited from executing based on the one or more memory page attributes for the extra data portion of the extended cache line.

2. The method of claim 1 wherein detecting that the page-crossing instruction is prohibited from executing comprises detecting that the page-crossing instruction is prohibited from executing based on the one or more memory page attributes for the main cache line portion of the extended cache line and the one or more memory page attributes for the extra data portion of the extended cache line.

3. The method of claim 1 further comprising reporting that the page-crossing instruction is prohibited from executing.

4. The method of claim 1 wherein caching the one or more memory page attributes for the extra data portion of the extended cache line comprises:
    obtaining non-permission based fault information in response to requesting one or more memory page attributes for the second part of the page-crossing instruction; and
    in response to obtaining the non-permission based fault information, caching one or more overloaded execution permissions that represent that execution is not permitted in any of one or more execution modes as the one or more execution permissions for the extra data portion of the extended cache line.

5. The method of claim 4 further comprising, in response to detecting that the page-crossing instruction is prohibited from executing:
    obtaining a fault type represented by the one or more overloaded execution permissions; and
    reporting the fault type.

6. The method of claim 1 further comprising:
    caching a plurality of instructions in the instruction cache, the plurality of instructions comprising one or more page-crossing instructions comprising the page-crossing instruction; and
    for each and only each page-crossing instruction location of one or more page-crossing instruction locations in the instruction cache, in response to caching instruction data in an extended cache line that corresponds to the page-crossing instruction location, caching the one or more memory page attributes for both the main cache line portion of the extended cache line and the extra data portion of the extended cache line.

7. The method of claim 1 further comprising invalidating the single extended cache line that contains the page-crossing instruction in response to detecting that the page-crossing instruction is prohibited from executing.

8. A processor comprising:
    an instruction cache that comprises extended cache lines where each extended cache line comprises a main cache line portion and an extra data portion;
    the processor configured to cache a page-crossing instruction in a single extended cache line of the instruction cache, where a first part of the page-crossing instruction resides in a first page of memory and is cached in the main cache line portion of the extended cache line and a second part of the page-crossing instruction resides in a second page of memory and is cached in the extra data portion of the extended cache line;
    the instruction cache configured to:
        cache one or more memory page attributes for the main cache line portion of the extended cache line in association with the extended cache line, wherein the one or more memory page attributes for the main cache line portion of the extended cache line comprise one or more execution permissions for the first page of memory, each comprising a plurality of execution permission bits representing whether execution is permitted for a corresponding plurality of processing modes; and
        cache one or more memory page attributes for the extra data portion of the extended cache line in association with the extended cache line, wherein the one or more memory page attributes for the extra data portion of the extended cache line comprise one or more execution permissions for the second page of memory, each comprising a plurality of execution permission bits representing whether execution is permitted for a corresponding plurality of processing modes;
    a fetch select logic configured to fetch the page-crossing instruction from the extended cache line; and
    a detection logic of a decode logic, configured to detect that the page-crossing instruction is prohibited from executing based on the one or more memory page attributes for the extra data portion of the extended cache line.

9. The processor of claim 8 wherein the detection logic is configured to detect that the page-crossing instruction is prohibited from executing based on the one or more memory page attributes for the main cache line portion of the extended cache line and the one or more memory page attributes for the extra data portion of the extended cache line.

10. The processor of claim 8, wherein the processor reports detecting that the page-crossing instruction is prohibited from executing.

11. The processor of claim 8 wherein in order to cache the one or more memory page attributes for the extra data portion of the extended cache line, the instruction cache is further configured to:
obtain non-permission based fault information in response to requesting one or more memory page attributes for the second part of the page-crossing instruction; and
in response to obtaining the non-permission based fault information, cache one or more overloaded execution permissions that represent that execution is not permitted in any of one or more execution modes as the one or more execution permissions for the extra data portion of the extended cache line.

12. The processor of claim 11 wherein, in response to detecting that the page-crossing instruction is prohibited from executing, the processor is further configured to:
obtain a fault type represented by the one or more overloaded execution permissions; and
report the fault type.

13. The processor of claim 8 wherein the instruction cache is further configured to:
cache a plurality of instructions in the instruction cache, the plurality of instructions comprising one or more page-crossing instructions comprising the page-crossing instruction; and
for each and only each page-crossing instruction location of one or more page-crossing instruction locations in the instruction cache, in response to caching instruction data in an extended cache line that corresponds to the page-crossing instruction location, cache the one or more memory page attributes for both the main cache line portion of the extended cache line and the extra data portion of the extended cache line.

14. The processor of claim 8 wherein the processor is further configured to invalidate the single extended cache line that contains the page-crossing instruction in response to detecting that the page-crossing instruction is prohibited from executing.

15. The processor of claim 8 integrated into a semiconductor die.

16. The processor of claim 8, wherein the processor is included in a device selected from a group consisting of a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

17. A processor comprising an instruction cache that comprises extended cache lines where each extended cache line comprises a main cache line portion and an extra data portion, comprising:
means for caching a page-crossing instruction in a single extended cache line of the instruction cache, where a first part of the page-crossing instruction resides in a first page of memory and is cached in the main cache line portion of the extended cache line and a second part of the page-crossing instruction resides in a second page of memory and is cached in the extra data portion of the extended cache line;
means for caching one or more memory page attributes for the main cache line portion of the extended cache line in association with the extended cache line, wherein the one or more memory page attributes for the main cache line portion of the extended cache line comprise one or more execution permissions for the first page of memory, each comprising a plurality of execution permission bits representing whether execution is permitted for a corresponding plurality of processing modes;
means for caching one or more memory page attributes for the extra data portion of the extended cache line in association with the extended cache line, wherein the one or more memory page attributes for the extra data portion of the extended cache line comprise one or more execution permissions for the second page of memory, each comprising a plurality of execution permission bits representing whether execution is permitted for a corresponding plurality of processing modes;
means for fetching the page-crossing instruction from the extended cache line; and
means for detecting that the page-crossing instruction is prohibited from executing based on the one or more memory page attributes for the extra data portion of the extended cache line.

18. A non-transitory computer-readable medium storing software for instructing a processor comprising an instruction cache that comprises extended cache lines where each extended cache line comprises a main cache line portion and an extra data portion to:
cache a page-crossing instruction in a single extended cache line of the instruction cache, where a first part of the page-crossing instruction resides in a first page of memory and is cached in the main cache line portion of the extended cache line and a second part of the page-crossing instruction resides in a second page of memory and is cached in the extra data portion of the extended cache line;
cache one or more memory page attributes for the main cache line portion of the extended cache line in association with the extended cache line, wherein the one or more memory page attributes for the main cache line portion of the extended cache line comprise one or more execution permissions for the first page of memory, each comprising a plurality of execution permission bits representing whether execution is permitted for a corresponding plurality of processing modes;
cache one or more memory page attributes for the extra data portion of the extended cache line in association with the extended cache line, wherein the one or more memory page attributes for the extra data portion of the extended cache line comprise one or more execution permissions for the second page of memory, each comprising a plurality of execution permission bits representing whether execution is permitted for a corresponding plurality of processing modes;
fetch the page-crossing instruction from the extended cache line; and
detect that the page-crossing instruction is prohibited from executing based on the one or more memory page attributes for the extra data portion of the extended cache line.

19. An instruction cache for a processor comprising:
one or more resources configured to cache:
a plurality of extended cache lines, each extended cache line of the plurality of extended cache lines comprising a main cache line portion and an extra data portion, the main cache line portion configured to cache a first part of a page-crossing instruction residing in a first page of memory and the extra data portion configured to cache a second part of the page-crossing instruction residing in a second page of memory;

one or more memory page attributes for the main cache line portion of each of the plurality of extended cache lines, wherein the one or more memory page attributes for the main cache line portion comprise one or more execution permissions for the first page of memory, each comprising a plurality of execution permission bits representing whether execution is permitted for a corresponding plurality of processing modes; and for each extended cache line of the plurality of extended cache lines that has a page-crossing instruction location, one or more additional memory page attributes for the extra data portion of the extended cache line that has the page-crossing instruction location, wherein the one or more additional memory page attributes for the extra data portion comprise one or more execution permissions for the second page of memory, each comprising a plurality of execution permission bits representing whether execution is permitted for a corresponding plurality of processing modes.

20. The instruction cache of claim 19 wherein the one or more execution permissions are overloaded in response to a non-permission type fault when fetching instruction data for the extra data portion of the extended cache line.

21. The instruction cache of claim 19 wherein the one or more resources are configured to cache the one or more additional memory page attributes only for a subset of the plurality of extended cache lines that have page-crossing instruction locations.

22. The instruction cache of claim 19 integrated into a semiconductor die.

23. The instruction cache of claim 19, wherein the instruction cache is included in a device selected from a group consisting of a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

24. An instruction cache for a processor comprising:
one or more means for caching:
a plurality of extended cache lines, each extended cache line of the plurality of extended cache lines comprising a main cache line portion and an extra data portion, the main cache line portion configured to cache a first part of a page-crossing instruction residing in a first page of memory and the extra data portion configured to cache a second part of the page-crossing instruction residing in a second page of memory;

one or more memory page attributes for the main cache line portion of each of the plurality of extended cache lines, wherein the one or more memory page attributes for the main cache line portion comprise one or more execution permissions for the first page of memory, each comprising a plurality of execution permission bits representing whether execution is permitted for a corresponding plurality of processing modes; and for each extended cache line of the plurality of extended cache lines that has a page-crossing instruction location, one or more additional memory page attributes for the extra data portion of the extended cache line that has the page-crossing instruction location, wherein the one or more additional memory page attributes for the extra data portion comprise one or more execution permissions for the second page of memory, each comprising a plurality of execution permission bits representing whether execution is permitted for a corresponding plurality of processing modes.

25. A non-transitory computer-readable medium storing software for instructing a processor to:
maintain one or more resources of an instruction cache to cache:
a plurality of extended cache lines, each extended cache line of the plurality of extended cache lines comprising a main cache line portion and an extra data portion, the main cache line portion configured to cache a first part of a page-crossing instruction residing in a first page of memory and the extra data portion configured to cache a second part of the page-crossing instruction residing in a second page of memory;

one or more memory page attributes for the main cache line portion of each of the plurality of extended cache lines, wherein the one or more memory page attributes for the main cache line portion comprise one or more execution permissions for the first page of memory, each comprising a plurality of execution permission bits representing whether execution is permitted for a corresponding plurality of processing modes; and for each extended cache line of the plurality of extended cache lines that has a page-crossing instruction location, one or more additional memory page attributes for the extra data portion of the extended cache line that has the page-crossing instruction location, wherein the one or more additional memory page attributes for the extra data portion comprise one or more execution permissions for the second page of memory, each comprising a plurality of execution permission bits representing whether execution is permitted for a corresponding plurality of processing modes.

26. A method of operation of a processor comprising an instruction cache that comprises extended cache lines where each extended cache line comprises a main cache line portion and an extra data portion, comprising:
fetching a page-crossing instruction from a single extended cache line of the instruction cache, where a first part of the page-crossing instruction resides in a first page of memory and is cached in the main cache line portion of the extended cache line;
detecting that the page-crossing instruction is prohibited from executing based on one or more memory page attributes for the extra data portion of the extended cache line;
caching a plurality of instructions in the instruction cache, the plurality of instructions comprising one or more page-crossing instructions comprising the page-crossing instruction; and for each and only each page-crossing instruction location of one or more page-crossing instruction locations in the instruction cache, in response to caching instruction data in an extended cache line that corresponds to the page-crossing instruction location, caching one or more memory page attributes for both a main cache line portion of the extended cache line and an extra data portion of the extended cache line.

* * * * *